United States Patent
Schuster et al.

(10) Patent No.: US 9,735,724 B2
(45) Date of Patent: Aug. 15, 2017

(54) ELECTRICAL DRIVE SYSTEM AND ENERGY STORAGE APPARATUS THEREFOR

(71) Applicant: Liebherr-Components Biberach GmbH, Biberach an der Riss (DE)

(72) Inventors: Wolfgang Schuster, Bad Waldsee (DE); Oliver Fenker, Warthausen (DE); Sven Welser, Äpfingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 14/898,097

(22) PCT Filed: May 13, 2014

(86) PCT No.: PCT/EP2014/001291
§ 371 (c)(1),
(2) Date: Dec. 11, 2015

(87) PCT Pub. No.: WO2014/198371
PCT Pub. Date: Dec. 18, 2014

(65) Prior Publication Data
US 2016/0126878 A1    May 5, 2016

(30) Foreign Application Priority Data

Jun. 11, 2013 (DE) .................. 10 2013 009 823

(51) Int. Cl.
*H02P 1/00* (2006.01)
*H02P 27/04* (2016.01)
(Continued)

(52) U.S. Cl.
CPC ................ *H02P 27/04* (2013.01); *B60K 6/28* (2013.01); *B60L 11/1805* (2013.01); *H02M 5/458* (2013.01); *H02P 27/06* (2013.01)

(58) Field of Classification Search
CPC ..... B60L 11/1887; B60L 2210/10; H02J 3/32; H02M 2001/0077; H02P 2201/07; H02P 27/06; H01M 2220/20
See application file for complete search history.

(56) References Cited

U.S. PATENT DOCUMENTS

| 5,373,195 A | 12/1994 | De Doncker et al. |
| 2001/0017240 A1 | 8/2001 | Araki et al. |
| (Continued) | | |

FOREIGN PATENT DOCUMENTS

| FR | 2969861 A1 | 6/2012 |
| WO | 0215363 A2 | 2/2002 |
| WO | 2007145628 A1 | 12/2007 |

OTHER PUBLICATIONS

ISA European Patent Office, International Search Report Issued in Application No. PCT/EP2014/001291, Sep. 26, 2014, WIPO, 6 pages.

*Primary Examiner* — Karen Masih
(74) *Attorney, Agent, or Firm* — McCoy Russell LLP

(57) ABSTRACT

A drive system may have at least one electric motor which can be fed via power electronics which can be connected via a DC circuit to a voltage source and an energy storage apparatus for buffering energy fed back from the electric motor. An energy storage apparatus for such a drive system may include at least one electrical storage block, a bidirectional DC/DC converter for connecting the named DC voltage circuit to the internal voltage circuit of the storage block and a control unit for controlling the DC/DC converter. The control unit may include output and feed control means for controlling the DC/DC converter. The DC/DC converter, the storage block and the control unit may be combined into an energy storage unit having a common housing in which the named components are received and at
(Continued)

whose outer side two connections are provided for connecting to the DC voltage circuit.

21 Claims, 3 Drawing Sheets

(51) Int. Cl.
*H02M 5/458* (2006.01)
*B60K 6/28* (2007.10)
*H02P 27/06* (2006.01)
*B60L 11/18* (2006.01)

(56) References Cited

U.S. PATENT DOCUMENTS

| | | |
|---|---|---|
| 2007/0137945 A1 | 6/2007 | Takasaki et al. |
| 2011/0133556 A1 | 6/2011 | Choi |
| 2013/0038249 A1* | 2/2013 | Tabatabaei ............... B60L 1/20 318/3 |
| 2013/0285615 A1 | 10/2013 | Viellard et al. |

* cited by examiner

ELECTRICAL DRIVE SYSTEM AND ENERGY STORAGE APPARATUS THEREFOR

CROSS REFERENCE TO RELATED APPLICATIONS

The present application is a U.S. National Phase of International Patent Application Ser. No. PCT/EP2014/001291, entitled "Electrical Drive System and Energy Storage Apparatus Therefor," filed on May 13, 2014, which claims priority to German Patent Application No. 10 2013 009 823.8, filed on Jun. 11, 2013, the entire contents of each of which are hereby incorporated by reference in their entirety for all purposes.

TECHNICAL FIELD

The present invention relates generally to drive systems having at least one electric motor which can be fed via power electronics which can be connected via a DC circuit to a voltage source and having an energy storage apparatus for buffering energy fed back from the electric motor. In this respect, the invention in particular relates to such an energy storage apparatus for connecting to a DC voltage circuit of power electronics, having at least one electrical storage block, having a DC/DC converter for connecting the named DC voltage circuit to the internal voltage circuit of the storage block and having a control unit for controlling the DC/DC converter. Such electric drive systems can be used with lifting apparatus, in particular cranes such as container bridge cranes or construction machinery such as concrete-mixer vehicles, but generally also with other mobile machinery or also machinery connected to the grid.

BACKGROUND AND SUMMARY

To save energy more and more drives which were previously driven mechanically or hydraulically are being electrified to be able to utilize the better efficiency of electric motors. Such an electrification is also underway in construction machinery such as concrete mixer vehicles, earthmoving machinery and mining machinery such as surface miners or cranes such as container bridge cranes, even though electric drives and their components can be used less easily than with work machines used in buildings due to rough working conditions such as dust exposure, powerful vibrations and the like.

In order not only to be able to utilize the better efficiency of electric motors themselves in such electric drive systems, but also furthermore to be able to save energy, electrical energy is buffered when it arises in the work cycle, for example on a lowering of loads or on braking, and is released again when energy is required, for example on the raising of loads, on accelerating, etc. The storage of the energy is sensibly brought about electrically here, for which purpose capacitors, in particular dual-layer capacitors, or other battery systems or rechargeable batteries are suited.

If such dual-layer capacitors are used as energy stores, so-called DC/DC converters or DC/DC transformers are required since the voltage over a dual-layer capacitor varies in dependence on a filling level. The named DC/DC transformer connects the dual-layer capacitor storage module to the drive elements or to the frequency inverter normally connected thereto and ensures the exchange of energy. Such DC/DC transformers or DC/DC converters designate an electric circuit which can convert a DC voltage supplied at the input into a DC voltage having a higher, lower or inverted voltage level and which is able to transfer energy from the high voltage level into the lower voltage level, for example to charge the energy storage block, and likewise to transfer energy in the other direction, e.g. to withdraw it, or to transfer it from the storage block into the DC voltage circuit of the drive system.

The linking of such an energy storage apparatus having a dual-layer capacitor to the respective drive system is, however, more or less complex and/or expensive since the individual modules of such an energy storage apparatus typically have to be laboriously configured together and have to be adapted to the framework conditions of the drive system, for example to its electric motor and power electronics. In this respect, a user or an application engineer is as a rule forced to deal with the complex internal routines in the energy store and in the DC/DC converter to be able to make the necessary designs with respect to the modules and to the internal operation. In addition, there is cabling work, which is more or less complex and/or expensive depending on the drive and the used unit, including high-current lines, bus wiring and SPS signals. At the same time, care must be taken with the initially named used unit that the energy storage apparatus has to withstand the rough operating conditions such as dust exposure and impact loads and vibration loads.

Starting from this, it is the underlying object of the present invention to provide an improved energy storage apparatus of the initially named kind as well as an improved drive system having such an energy storage apparatus, to avoid the disadvantages of the prior art and to further develop the latter in an advantageous manner. The linking of the energy storage apparatus to a respective drive system should in particular be dramatically simplified and in this respect the buffering and subsequent output of the electrical energy into and out of the energy store should nevertheless be designed efficiently and reliably.

The named object is achieved in accordance with the invention by the claimed energy storage apparatus and by the claimed drive system having such an energy storage. The use of such a drive system in a lifting apparatus and in a construction machine is furthermore a subject of the invention.

It is therefore proposed to combine the electric components of the energy storage apparatus to a plug-and-play module which can be simply connected by user in the manner of a black box to the power electronics or to the DC voltage circuit for supplying the drive system and which itself adapts to the circumstances of the system environment or carries out the required control adaptations. In accordance with the invention, the energy storage unit is characterized in that the DC/DC converter is bidirectional, the control unit has output and feed control means for controlling the DC/DC converter both on the outputting of power from the storage block to the DC voltage circuit and on the feeding of power from the DC voltage circuit into the storage block, and the named DC/DC converter, the storage block and the control unit are combined into an energy storage unit having a common housing in which the DC/DC converter, the storage block and the control unit are received and at whose outer side two connections are provided for connecting to the DC voltage circuit. Both the feed and the output of power into or out of the storage block therefore take place via the DC/DC converter which controls both the power output and the feed so that a simple link to the DC voltage circuit of the drive system is possible. In this respect, the energy storage apparatus forms an integral overall system which combines the participating and required components in a single housing into which the control for the energy management is also installed. Only the two connections present at the outer housing side essentially have to be connected to the DC voltage circuit of the drive system, wherein the control unit in the interior of the housing of the energy storage apparatus adapts the required control and regulation parameters to the drive system.

The storage block of the energy storage apparatus can in particular comprise at least one capacitor, optionally in the form of a dual-layer capacitor, for energy storage, wherein in principle, however, at least one battery or rechargeable battery can also be provided in addition or alternatively to such one or more capacitors.

To avoid thermal problems of the energy storage apparatus, the at least one storage block and/or the DC/DC converter and/or the control unit can be connected in the interior of the common housing to a cooling circuit which can optionally have coolant connections at the housing for connection to an external cooling circuit to lead the heat entering into the coolant out of the storage block and/or the DC/DC converter and/or the control unit from the housing and to be able to output it externally. To allow a simple assembly, the named coolant connections can be configured as pluggable so that only the coolant lines of the external cooling circuit have to be connected to the housing of the energy storage apparatus.

The internal and/or external cooling circuit and its components such as coolant circulators, cooling air fans, switchover valves, flow controllers and the like are controlled by the control unit in the interior of the energy storage apparatus in dependence on the temperature, in particular in dependence on the temperature of a component in the interior of the housing of the energy storage apparatus and/or on an environmental temperature. For this purpose, at least one temperature sensor can be provided and can be connectable to the control unit, said temperature sensor measuring the named component temperature and/or environmental temperature and/or the temperature of the housing interior. Alternatively or additionally, the control unit can be connectable to a flowmeter to be able to regulate the flow quantity of the cooling medium.

To be able not only to simply plug the coolant lines to the housing, the electric connections and/or the signal connections of the energy storage apparatus can also be formed as pluggable or as plugs at the outer side of the housing so that the corresponding power lines or signal lines only have to be plugged in.

To allow a simple handling and a simple transport of the energy storage apparatus, the housing into which the components of the module are integrated can be formed as divisible and can comprise a plurality of housing parts which can be put together to form a common housing into which at least the DC/DC converter, the storage block and the control unit are integrated. Different electrical components which can be connected to one another by releasable connection means, in particular plug-in contacts, on the putting together of the housing parts can be accommodated in the different housing parts. For example, plug connection parts can be attached to the interfaces of the housing parts or elsewhere such that, on the putting together or joining together of two housing parts, the plug-in connections are automatically also closed or come into engagement to connect together the electronic components which are accommodated in the two housing parts.

To ensure a secure, safe use of the energy storage unit, a warning signal device can be provided in a further development of the invention to output a warning signal when the energy storage unit is still charged with energy and in this respect voltage can still be applied at the outer connection contacts and thus a possible dangerous potential is present. The warning signal device can, for example, be visually configured and can provide a warning signal visible from the outside, but can optionally also work acoustically or in another manner.

Alternatively or additionally to such a warning signal device, an electrical disconnect switch can advantageously also be provided for disconnecting the storage block and/or for deenergizing the connections at the housing, wherein the named disconnect switch can be formed internally or in the interior of the housing of the energy storage unit as a disconnect circuit. The connections led out of the energy storage system can be deenergized voltage-wise with the aid of such an electric disconnect switch, whereby the danger potential is considerably reduced.

Alternatively or additionally, the energy storage apparatus can also comprise an integrated discharge circuit which can advantageously be actuable from the outside or can convert the energy still contained in the storage block into heat on a command from the outside. Accordingly, the storage block can be discharged by a control signal which can be given to the energy storage unit from the outside, for example wen the energy storage apparatus should be decoupled from the drive system.

The housing can advantageously be formed in a sufficiently high IP safety class which allows the use of the storage system outdoors. The energy storage apparatus is advantageously mechanically configured such that it can also be used under high vibration loads such as occur with mobile work machines such as construction machinery and cranes or by a correspondingly strong design of the housing and/or a damping embedding of the electrical components in the housing and/or a suitable design of the electrical components themselves.

The control apparatus integrated into the energy storage unit can generally have different designs or can implement differing operating modes. The control apparatus is generally adapted to the specific properties of the storage elements of the at least one storage block in an advantageous further development of the invention and contains control means for carrying out the energy management in accordance with the specific properties of the named storage elements.

To be able to efficiently control the efficient use of the buffered energy and its feeding back into the drive system or the charging of the storage block, the control unit integrated into the energy storage unit can also determine information or operating parameters relating to the state of the energy storage unit, in particular of the storage block and/or for external use. The control system can, for example, comprise control means for determining an energy index and for providing and/or transmitting this energy index to a higher-ranking control, wherein the named energy index represents the energy available in the store.

In accordance with another advantageous further development of the invention, the integrated control apparatus can also process information coming from the outside and/or can convert control commands, for example such that the control apparatus comprises control and/or regulation means for the DC/DC converter which means, in response to a control signal, convert power values definable from the outside for the charging and/or discharging by desired value default for the regulation of the DC/DC converter.

Alternatively or additionally, the control system can be supplied from the outside with configurable parameters and can carry out a characteristic controlled operating mode on the basis of these configurable parameters fed in from the outside.

In an advantageous further development of the invention, the integrated control apparatus can comprise power control means for the regulation and/or control and/or for limiting the maximum transferable powers. Alternatively or additionally, the integrated control apparatus can comprise voltage regulation and/or control means for regulating or controlling the output voltage of the energy storage unit.

The energy storage apparatus advantageously comprises at least one voltage sensor which measures the voltages at the input and/or over the storage block. In conjunction with the previously named control or regulation means, the named voltage signal can be used to regulate the output voltage, but also to transmit corresponding measured values of the current and voltage via a communication connection to an external and/or higher-ranking control apparatus.

In an advantageous further development of the invention, the modular energy storage unit cannot only be used alone, but can rather be connected to a plurality of such energy storage units. At least two, but also more than two, energy storage units can in particular be connected in parallel, wherein in a further development of the invention a plurality of such energy storage units can be connected directly in parallel with the outwardly leading power connections, e.g. plus to plus and minus to minus. The control apparatus of the or each module is in this respect advantageously configured such that it supports such a parallel connection.

The energy storage units can in particular be equipped with a communication link which allows a communication of the energy storage units among one another or a communication of the integrated control apparatus among one another. The named communication apparatus can, for example, comprise a bus system via which the energy storage units connected in parallel can communicate with one another.

In a further development of the invention, the control apparatus of the energy storage units is provided with control means or regulating means which automatically adjust all the storage blocks to a uniform energy amount with a plurality of energy stores connected in parallel or control them accordingly.

To allow a simple linking to the drive system even on a use of a plurality of energy storage units, the plurality of energy storage units can be connected among one another to a further electric line which leads to the connection of the respective internal storage block.

On a connecting together of a plurality of energy storage units, their control apparatus can interact with one another in different manners. For example, the control apparatus can act as peers with one another and can each be directly linked to a higher-ranking control, for example via a control bus.

In an alternative further development of the invention, the control apparatus of the energy storage units coupled to one another can also act with one another in a hierarchical manner, in particular such that a control apparatus of an energy storage unit forms a higher-ranking master unit and the control apparatus of the remaining energy storage units form slave units. The master unit defines conditions and/or direct control commands for the other slave units which are then carried out in a corresponding dependency. The control apparatus acting as a master unit can in particular communicate with a higher-ranking control, whereas the control apparatus acting as a slave unit can only communicate with the named master unit. The module defined as the master unit also determines and communicates the desired value defaults for the power regulation and/or other control parameters for the other modules defined as slave units.

The control apparatus acting as a master unit can advantageously have an interface for all common industrial field buses.

The invention will be explained in more detail in the following with respect to preferred embodiments and to associated drawings.

DETAILED DESCRIPTION

Figure 1:
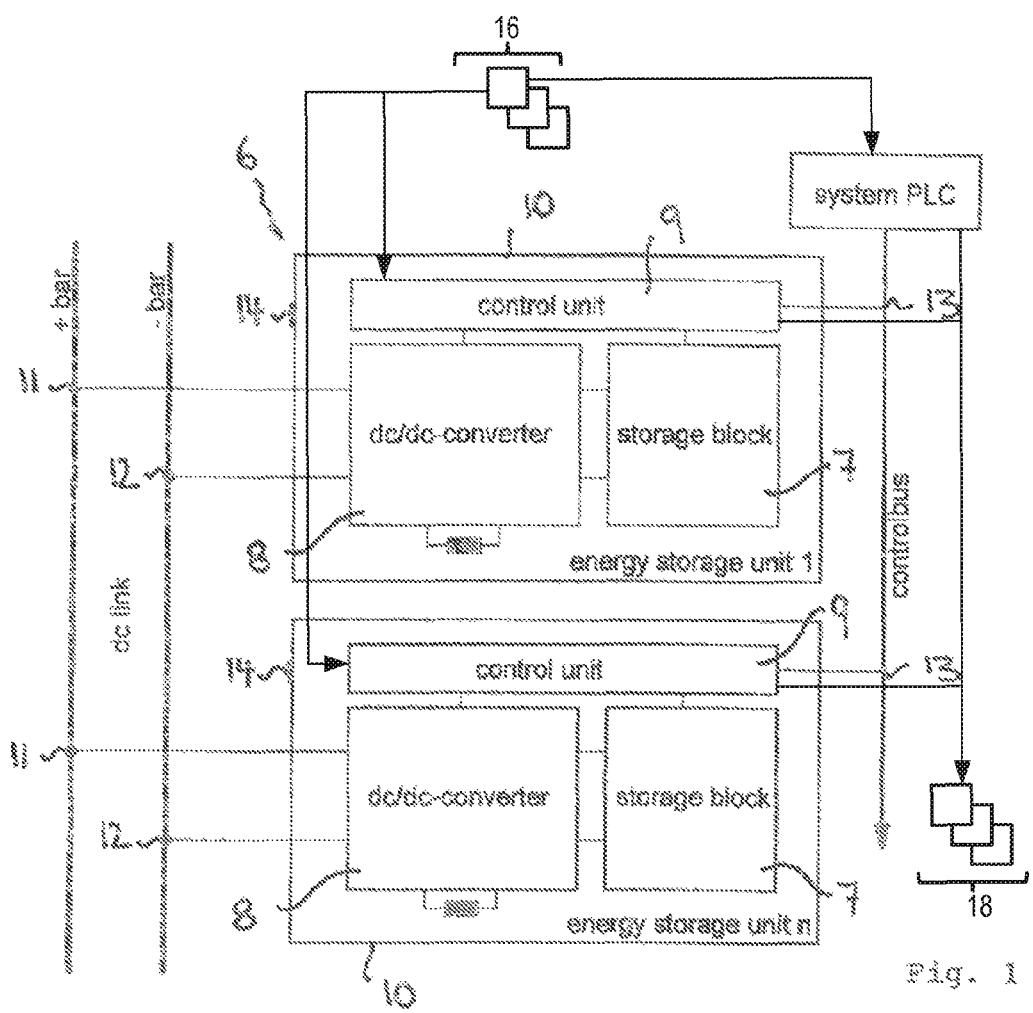
FIG. 1 shows a schematic representation of an energy storage apparatus in accordance with a first advantageous embodiment of the invention, wherein two energy storage units, which each comprise a storage block, a control apparatus and a DC/DC converter integrated into a common housing, are arranged connected in parallel with one another and comprise control apparatus communicating with each other and with a higher-ranking control as peers.
Figure 2:
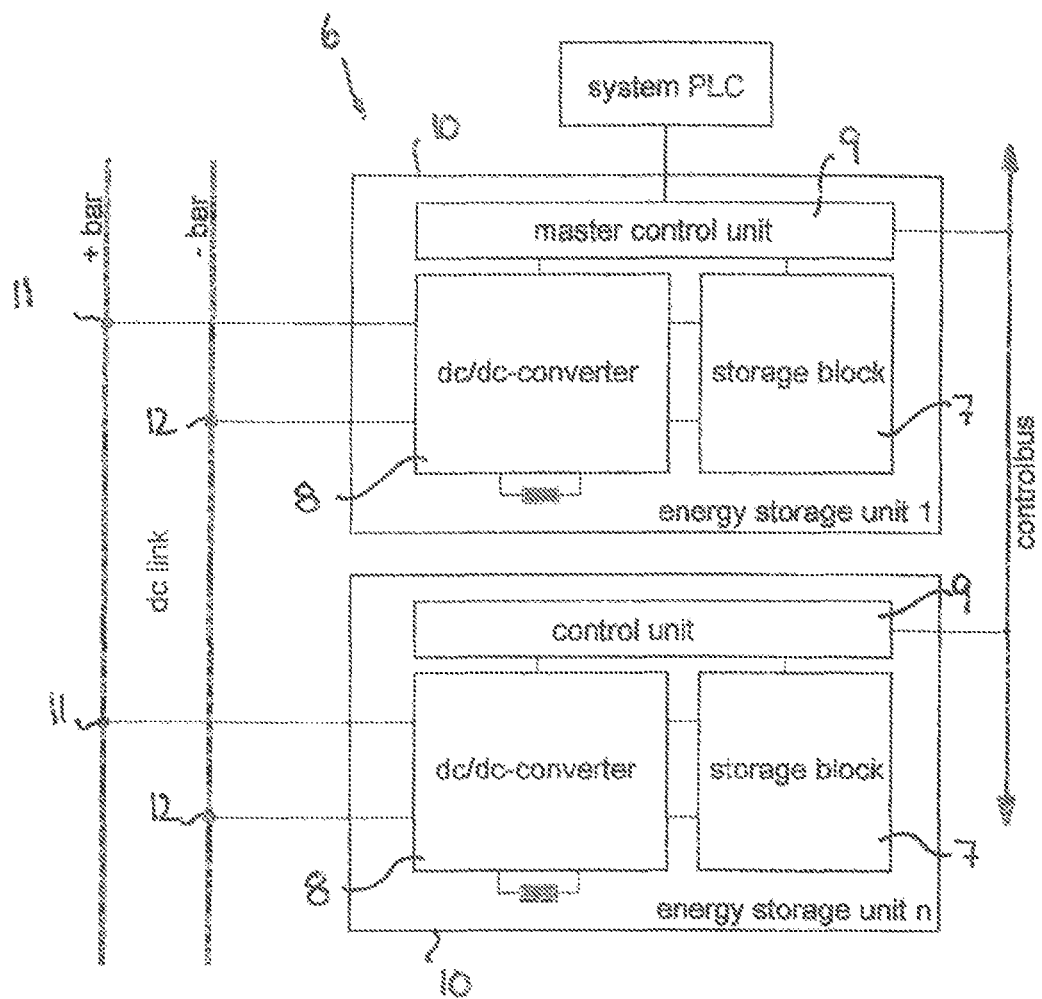
FIG. 2 shows a schematic representation of an energy storage apparatus in accordance with a second advantageous embodiment of the invention in which two energy storage units are likewise arranged connected in parallel with one another, but unlike the embodiment in accordance with FIG. 1, the control apparatus of the energy storage units act as master and slave units.
Figure 3:
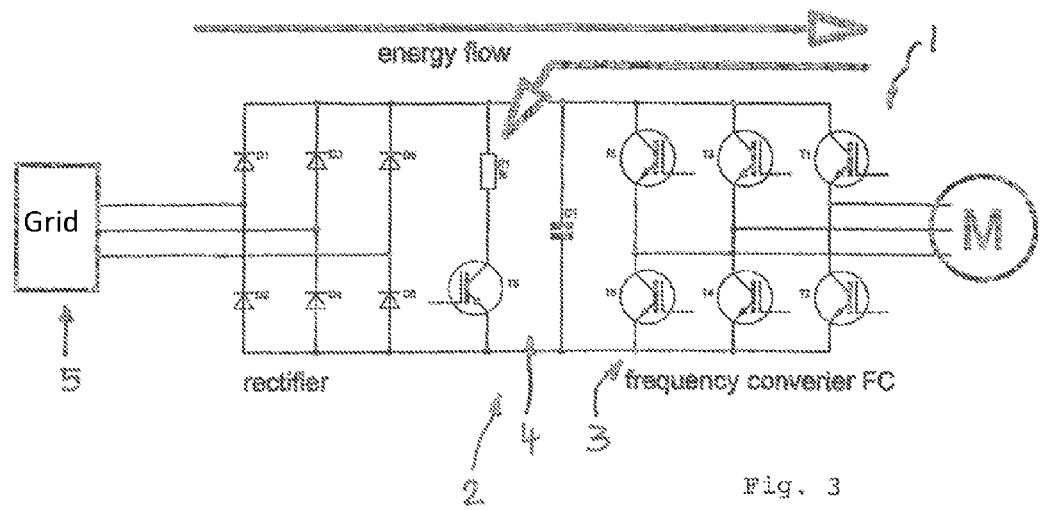
FIG. 3 shows a schematic representation of a drive system with a mains feed and an electric motor controlled via a frequency inverter, wherein the frequency inverter is supplied from a DC voltage intermediate circuit to which the energy storage apparatus from FIGS. 1 and 2 can be linked.

FIG. 3 shows an example of a drive system 1 to which the energy storage apparatus in accordance with embodiments of the invention shown by way of example in FIGS. 1 and 2 can be connected. The drive system 1 can comprise an electric motor M which can be supplied via power electronics 2 from a current source or voltage source (e.g. grid) 5, wherein the named current source 5 can be a mains connection or also a generator which can, for example be driven by a diesel engine, as is frequently the case with construction machinery. The named electric motor M can drive different adjustment units. They can, for example, as initially stated, be a hoisting gear and/or a travel drive of a lifting apparatus, for example in the form of a crane, in particular of a container bridge crane, or an actuating drive or a drive unit of a mobile construction machine such as a mobile mixer.

As FIG. 3 shows, the power electronics 2 can comprise a frequency inverter 3 which controls and supplies the electric motor M. The named frequency inverter 3 can in turn be supplied from a DC voltage circuit or an intermediate DC voltage circuit 4 which is connected to the current source 5 and which can work as a rectifier. The named intermediate DC voltage circuit 4 can in particular comprise an intermediate circuit capacitor C1 to whose two voltage connections an energy storage apparatus 6 can be connected, as is shown in FIGS. 1 and 2. The linking of the at least one storage block 7 of the energy storage apparatus 6 can in particular take place via a DC/DC converter 8 which links the output voltage U2 of the storage block 7 to the voltage U1 of the intermediate DC voltage circuit 4, cf. FIG. 4.

When the electric motor M of the drive system 1 drives, energy is taken from the intermediate DC voltage circuit 4 and supplied to the electric motor M, wherein the subsequent supply of the energy from the current source 5 takes place via the mains rectifier which forms the left hand circuit part of the power electronics in FIG. 3. If, however, the electric motor M brakes, energy is fed from the electric motor M into the DC voltage system. In conventional systems without any intermediate energy storage, this fed back energy, designated in FIG. 3 by the reference symbol R1, is typically destroyed to form heat, wherein such high-load resistors can be connected via the DC voltage system by means of electronic switches T5 to avoid any destruction of the power electronics by the fed back energy.

The energy storage system, which is connected, for example, to the connections of the intermediate circuit capacitor C1, now serves not to destroy the fed back energy from the intermediate DC voltage circuit 4, but rather to take it up and to make it available again at a later time. The energy store itself can in this respect be formed from different electric components which can be considered for this purpose. They can in particular be dual-layer capacitors or also battery cells or rechargeable batteries as are used in emergency power plants. For example, a storage block 7, which outputs a variable summed voltage depending on the cell type and the charge state, can be formed from a plurality of such cells—for example a plurality of dual-layer capacitors—by a serial connection and/or a parallel connection.

The circuit is now advantageously configured such that the maximum voltage of the storage block 7 is lower than the minimum voltage of the intermediate DC voltage circuit 4. As FIG. 4 shows, the output voltage U2 of the storage block 7 can be, for example, in the range from 250 to 500 V, whereas the voltage U1 over the connections of the intermediate DC voltage circuit 4 can, for example, amount to 650 V.

Figure 4:
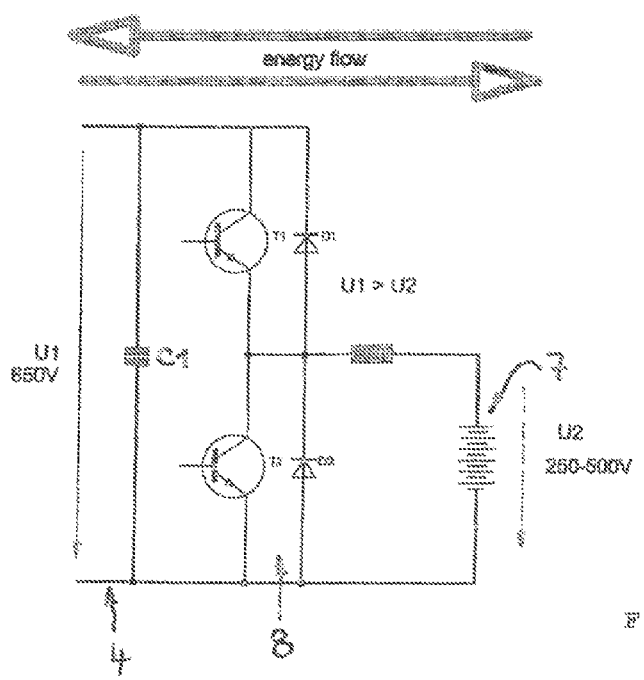
FIG. 4 shows a schematic representation of the link of the storage block of FIGS. 1 and 2 to the DC voltage intermediate circuit of FIG. 3 via a DC/DC converter.

The DC/DC converter 8 now connects the two voltage systems to one another, wherein the circuit of the DC/DC converter is able to transfer energy from the high voltage level into the low voltage level, which corresponds to a charging of the storage block 7, and also to transfer it in the other direction, which corresponds to the withdrawal or to an energy transfer from the storage block 7 into the intermediate circuit 4, cf. FIG. 4.

As FIGS. 1 and 2 show, the energy storage apparatus 6 is advantageously characterized by a plug-and-play configuration so that the energy storage apparatus 6 can be simply connected to the intermediate circuit 4 in the manner of a black box. In this respect, a respective storage block 7, which can, as mentioned, comprise a plurality of storage cells, for example in the form of dual-layer capacitors, is combined together with a DC/DC converter 8 and a control apparatus 9, which effects the energy management of the energy storage apparatus, to form an energy storage unit and is integrated into a common housing 10 which, as mentioned, can be composed of different housing parts. Only two power connections 11 and 12, which can advantageously be configured as plugs, and signal line connections 13 are provided at the outer side of the housing 10 of an energy storage unit, via which signal line connections the control apparatus 9 can communicate with a higher-ranking control PLC or the control apparatus 10 of a different energy storage unit such as via a bus system. Furthermore, respective coolant connections 14 can be provided at the housing 10 of an energy storage unit to be able to connect a cooling circuit integrated into the housing 10 for the cooling of the storage block 7 and/or of the DC/DC converter 8 and/or of the control apparatus 9 to an external cooling circuit of the work machine. Control apparatus 9 and 10 and the higher ranking control PLC may each include non-transitory computer readable storage medium including instructions stored therein for carrying out the control actions discussed herein. Further, control apparatus 9 and 10 and the higher ranking control PLC may each receive signals from various sensors such as sensors 16 of FIG. 1 and employ various actuators such as actuators 18 of FIG. 1 to adjust operation of the energy storage system and drive system based on the received signals and instructions stored in the non-transitory computer readable storage medium. Sensors 16 may include, for example, at least one temperature sensor measuring temperature of component(s) inside the housing and/or environmental temperature and /or the temperature of the housing interior, at least one voltage sensor which measures the voltages at the input and /or over the storage block, etc. Actuators 18 may include, for example, the various components of the drive system and energy storage apparatus.

As FIG. 1 shows, a plurality of such energy storage units can be connected in parallel and can be connected in this configuration to the intermediate DC voltage circuit 4, wherein the outwardly leading power connections 11 and 12 can be directly connected in parallel, e.g. + to + and − to −. The mutually connected control apparatus 9 of the energy storage units communicate with one another via the control bus and in particular support the named parallel connection such that all the storage blocks of the units connected in parallel are automatically set to a uniform energy amount. The storage blocks 7 can in this respect each have a symmetrizing circuit which brings the individual voltages of the storage cells to a value which is as uniform as possible.

As FIG. 2 shows, the control apparatus 9 of the energy storage units connected in parallel can also communicate with one another in a hierarchical manner, wherein a control apparatus 9 acts as a master unit which controls the other control apparatus 9 acting as slave units, supplies them with control defaults and/or with direct control commands and communicates with the higher-ranking system control PLC.

The control apparatus 9 of the storage units can in this respect comprise the control and/or regulation means already initially described in more detail and can be provided with or connected to corresponding sensors, detection circuits or sensor circuits so that the energy storage apparatus 6 or its energy storage units, which can be combined connected in a parallel, can carry out the likewise already initially explained functions.

The invention claimed is:

1. An energy storage apparatus for connecting to a DC voltage circuit of power electronics of a drive system, comprising at least one electrical storage block, a DC/DC converter for the connection of the DC voltage circuit to an internal voltage circuit of the storage block and a control apparatus for controlling the DC/DC converter, wherein the DC/DC converter is bidirectional, wherein the control apparatus has output and feed control means for controlling the DC/DC converter both for the outputting of current from the storage block to the DC voltage circuit and for the feeding of current from the DC voltage circuit into the storage block, and wherein the storage block, the DC/DC converter and the control apparatus are combined to form an energy storage unit having a common housing into which the storage block, the DC/DC converter, and the control apparatus are received and to whose outer side two power connections are provided for connection to the DC voltage circuit of the power electronics.

2. The energy storage apparatus in accordance with claim 1, wherein the storage block comprises at least one dual-layer capacitor, for energy storage.

3. The energy storage apparatus in accordance with claim 1, wherein the storage block and/or the DC/DC converter and/or the control apparatus are linked in the housing to an internal cooling circuit which has coolant connections at the housing for connection to an external cooling circuit.

4. The energy storage apparatus in accordance with claim 3, wherein the internal and/or external cooling circuit is controllable by the control apparatus in dependence on a temperature of an electric component in the housing and/or on an environmental temperature and/or on an inner housing temperature.

5. The energy storage apparatus in accordance with claim 3, wherein the coolant connections are configured as pluggable.

6. The energy storage apparatus in accordance with claim 1, wherein the housing is configured as divisible and comprises a plurality of housing parts which can be put together to form the housing, and wherein different electric components of the energy storage unit, which are connectable to one another by conductive connection means, are accommodated in different housing parts of the plurality of housing parts.

7. The energy storage apparatus in accordance with claim 6, wherein the conductive connection means comprise plug-in contacts, which automatically come into contact on the putting together of the housing parts, and which are provided at interfaces of the housing parts.

8. The energy storage apparatus in accordance with claim 1, wherein a warning signal device is provided for outputting a warning signal when the storage block is still charged with energy and/or a disconnect switch is provided for disconnecting the storage block and/or for deenergizing the power connections at the housing.

9. The energy storage apparatus in accordance with claim 1, wherein a discharge circuit is provided for converting energy stored in the storage block into heat, the discharge circuit controllable by a control command from outside of the energy storage apparatus.

10. The energy storage apparatus in accordance with claim 1, wherein the control apparatus comprises control means for determining an energy index and for providing and/or transferring the energy index to a higher-ranking control, with the named energy index representing the energy available in the storage block.

11. The energy storage apparatus in accordance with claim 1, wherein the control apparatus comprises control and/or regulation means for the DC/DC converter which, in response to a control signal from outside, converts definable power values for charging and/or discharging of the storage block by desired value defaults for regulation of the DC/DC converter.

12. The energy storage apparatus in accordance with claim 1, wherein the control apparatus comprises power control means for regulating or controlling and/or limiting maximum transferable powers and/or comprises voltage regulation and/or control means for regulating or controlling an output voltage of the energy storage unit.

13. The energy storage apparatus in accordance with claim 1, wherein the control apparatus is configured such that it can be supplied with configurable parameters from the outside and carries out a characteristic-controlled mode of operation on the basis of the configurable parameters from the outside.

14. The energy storage apparatus in accordance with claim 1, further comprising a plurality of energy storage units which each have a storage block, a DC/DC converter and a control apparatus accommodated in a housing, the energy storage units connected to one another in a parallel connection.

15. The energy storage apparatus in accordance with claim 14, wherein the plurality of energy storage units are directly connected to one another by external power connections in each case plus to plus and minus to minus.

16. The energy storage apparatus in accordance with claim 14, wherein the control apparatus of the energy storage units connected in parallel are connected to one another, preferably via a bus system, and support the parallel connection such that all the storage blocks are set and/or controlled to an at least approximately uniform energy amount.

17. The energy storage apparatus in accordance with claim 14, wherein the control apparatus of one energy storage unit of the plurality of energy storage units is defined as a master unit and the control apparatus of the other energy storage units of the plurality of energy storage units are defined as slave units which are controllable by the master unit.

18. An apparatus, comprising:
a drive system having at least one electric motor which is fed via power electronics, the power electronics connected via a DC voltage circuit to a voltage source, the drive system further comprising at least one energy storage apparatus for a buffering of energy fed back from the electric motor, the energy storage apparatus comprising at least one electrical storage block, a DC/DC converter for the connection of the DC voltage circuit to an internal voltage circuit of the storage block and a control apparatus for controlling the DC/DC converter, wherein the DC/DC converter is bidirectional
wherein a maximum voltage of the at least one storage block of the energy storage apparatus is kept lower than a minimum voltage of the DC voltage circuit.

19. The apparatus in accordance with claim 18, wherein both feeding of fed back energy of the electric motor into the energy storage apparatus and outputting of buffered energy from the energy storage apparatus to the DC voltage circuit takes place via the DC/DC converter of the energy storage apparatus.

20. The apparatus in accordance with claim 18, wherein the apparatus is a container bridge crane.

21. The apparatus in accordance with claim 18, wherein the apparatus is a concrete mixer vehicle.

* * * * *